US012256132B2

United States Patent
Burnsed et al.

(10) Patent No.: US 12,256,132 B2
(45) Date of Patent: Mar. 18, 2025

(54) AUTO-ALIGNMENT OF MULTI-SENSOR OVERLAY USING BI-DIRECTIONAL DETECTOR/DISPLAY

(71) Applicant: L3Harris Technologies, Inc., Melbourne, FL (US)

(72) Inventors: Jon D. Burnsed, Tempe, AZ (US); Jacob J. Becker, Gilbert, AZ (US)

(73) Assignee: L3HARRIS TECHNOLOGIES, INC., Melbourne, FL (US)

(*) Notice: Subject to any disclaimer, the term of this patent is extended or adjusted under 35 U.S.C. 154(b) by 692 days.

(21) Appl. No.: 17/503,755

(22) Filed: Oct. 18, 2021

(65) Prior Publication Data

US 2023/0117148 A1   Apr. 20, 2023

(51) Int. Cl.

| | |
|---|---|
| *H04N 23/11* | (2023.01) |
| *F41G 1/32* | (2006.01) |
| *G01J 5/02* | (2022.01) |
| *G02B 23/12* | (2006.01) |
| *H04N 23/70* | (2023.01) |

(52) U.S. Cl.
CPC .............. *H04N 23/11* (2023.01); *F41G 1/32* (2013.01); *G01J 5/0265* (2013.01); *G02B 23/12* (2013.01); *H04N 23/70* (2023.01)

(58) Field of Classification Search
CPC ........ G01J 5/0265; G02B 23/12; H01J 31/50; H04N 23/11; H04N 23/15; H04N 23/55; H04N 23/57; H04N 23/61; H04N 23/633; H04N 23/70; H04N 5/265
USPC .......................................................... 348/33
See application file for complete search history.

(56) References Cited

U.S. PATENT DOCUMENTS

| | | |
|---|---|---|
| 8,830,204 B2 | 9/2014 | Sultenfuss et al. |
| 9,097,891 B2 | 8/2015 | Border et al. |
| 2004/0196566 A1 | 10/2004 | Beystrum et al. |
| (Continued) | | |

FOREIGN PATENT DOCUMENTS

| | | |
|---|---|---|
| GB | 2538256 A | 11/2016 |
| WO | 2004002143 | 12/2003 |
| (Continued) | | |

OTHER PUBLICATIONS

European Search Report received for EP Patent Application No. 22201767.5, mailed on Feb. 16, 2023, 7 pages.
U.S. Appl. No. 16/868,306, filed May 6, 2020.

*Primary Examiner* — Kathleen M Walsh
(74) *Attorney, Agent, or Firm* — NIXON & VANDERHYE P.C.

(57) ABSTRACT

An optical device includes an underlying device configured output light to an optical output to output an image of objects in an environment to a user. The light is output in a first spectrum. A stacked device is configured to be coupled in an overlapping fashion to an optical output of the underlying device. The stacked device is transparent, according to a first transmission efficiency, to light in the first spectrum. The stacked device includes a plurality of electro-optical circuits including: a plurality of light emitters configured to output light, and a plurality of detectors configured to detect light in the first spectrum from the underlying device that can be used to detect the objects in the image. The light emitters are configured to output light dependent on light detected by the detectors and additional information about characteristics of the objects in the environment.

20 Claims, 6 Drawing Sheets

(56) References Cited

U.S. PATENT DOCUMENTS

| | | | |
|---|---|---|---|
| 2006/0291849 A1* | 12/2006 | Shamir | H04N 23/53 |
| | | | 348/E5.025 |
| 2008/0170119 A1* | 7/2008 | McCann | G02B 27/017 |
| | | | 348/113 |
| 2010/0277595 A1 | 11/2010 | Reed et al. | |
| 2018/0109739 A1* | 4/2018 | Foley | H04N 17/002 |
| 2018/0329024 A1* | 11/2018 | Send | G01S 17/46 |
| 2020/0074603 A1* | 3/2020 | Vollmerhausen | G06T 3/4015 |
| 2020/0400944 A1 | 12/2020 | Burnsed et al. | |

FOREIGN PATENT DOCUMENTS

| | | | | |
|---|---|---|---|---|
| WO | WO-03105084 A2 * | 12/2003 | | H04N 5/33 |
| WO | 2007049213 | 5/2007 | | |
| WO | WO-2018017177 A2 * | 1/2018 | | G02B 23/12 |

\* cited by examiner

AUTO-ALIGNMENT OF MULTI-SENSOR OVERLAY USING BI-DIRECTIONAL DETECTOR/DISPLAY

BACKGROUND

Background and Relevant Art

Night vision systems allow a user to see in low-light environments without external human visible illumination. This allows for covert vision in a low-light environment to prevent flooding the environment with human visible light and/or protects the user from being detected due to causing human visible light or light that is otherwise detectable to other night vision systems to be emitted.

Some night vision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Nightvision systems can fuse multiple technologies within a single nightvision system to provide various functionalities. For example, while a nightvision system may include an image intensifier based element as described above, the night vision system may further include other sensors to detect other characteristics. For example, a given nightvision system may include a plurality of sensors, including sensors sensitive to visible light, shortwave infrared (SWIR) light, longwave infrared (LWIR), or other wavelengths. For example, consider a case where a system detects both visible light as well as thermal energy using a visible light sensor and a thermal camera sensor. The system then outputs both visible light imaging and thermal imaging to the user. Typically, the various different sensors used to fuse different technologies are implemented laterally with respect to each other, and thus have differing angular positions with respect to a user's eye. This can cause a parallax issue for the user when viewing output from two different sensors.

Fusion of multi-sensor (Visible/SWIR/LWIR/etc) systems through overlay displays, whether using beam combiners, waveguides, or other technologies, rely on complicated calibration and software correction of the parallax suffered through the use of sensors mounted in different positions, whether different in lateral, axial, or vertical positions. This parallax often results in errors in the overlay placement meaning the different sensor inputs do not properly register in space when viewed by the user. In particular, a user will often see the outputs from the different sensors slightly or significantly offset from each other. Further, some sensors have more latency than other sensors. For example, image intensifiers, which typically implement little or no digital signal processing, are low latency meaning that the user sees, in essentially real time, motions occurring in the scene. In contrast, thermal camera sensors have significant digital signal processing and corresponding high latency meaning that there is somewhat of a delay between when motion occurs in the scene and when the user is able to see the motion from the output of the thermal camera sensor. Thus, when a user is viewing the output of these two sensors simultaneously in a nightvision system, significant and jarring effects occur as one image in the scene lags other images in the scene.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an optical device. The optical device includes an underlying device configured output light to an optical output. This is done to output an image of objects in an environment to a user. The light is output in a first spectrum as a result of absorbing input light. A stacked device is configured to be coupled in an overlapping fashion to an optical output of the underlying device. The stacked device is transparent, according to a first transmission efficiency, to light in the first spectrum. The stacked device includes a plurality of electro-optical circuits including: a plurality of light emitters configured to output light and a plurality of detectors configured to detect light in the first spectrum from the underlying device that can be used to detect the objects in the image. The light emitters are configured to output light dependent on light detected by the detectors and additional information about characteristics of the objects in the environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to an optical device that includes an underlying device configured output light. Such a device may be, for example, an image intensifier. The light displays an image of objects in an environment to a user. The light output is based on absorption of input light. Thus, for example, an image intensifier outputs visible light as a result of absorbing weak input light.

The optical device further includes a stacked device configured to be coupled in an overlapping fashion to an optical output of the underlying device. The stacked device it at least partially transparent, according to a predetermined transmission efficiency, to light output by the underlying device. The underlying device further includes various electro-optical circuits. Among these are light emitters configured to output light to the user. Thus, light from the underlying device combined with light from the stacked device can be output to the user. These two different outputs can be coordinated. Thus, for example, color light output from the stacked device may be used to colorize monochrome light output from the underlying device.

The stacked device further includes detectors configured to detect light from the underlying device to detect the objects in the image. That is, the stacked device includes functionality to facilitate detecting objects in images output by the underlying device. The light emitters of the stacked device are configured to output light dependent on light detected by the detectors and additional information about characteristics of the objects in the environment. For example, the additional information may include information from a different sensor detecting the same objects. Thus, for example, output from a thermal camera sensor detecting an object may be used to colorize a monochrome image of an object in a scene output by an image intensifier. Further, by the stacked device being used to detect images in a scene output by the underlying device, the light output from the stacked device can be better correlated to the light output by the underlying device.

Figure 1:
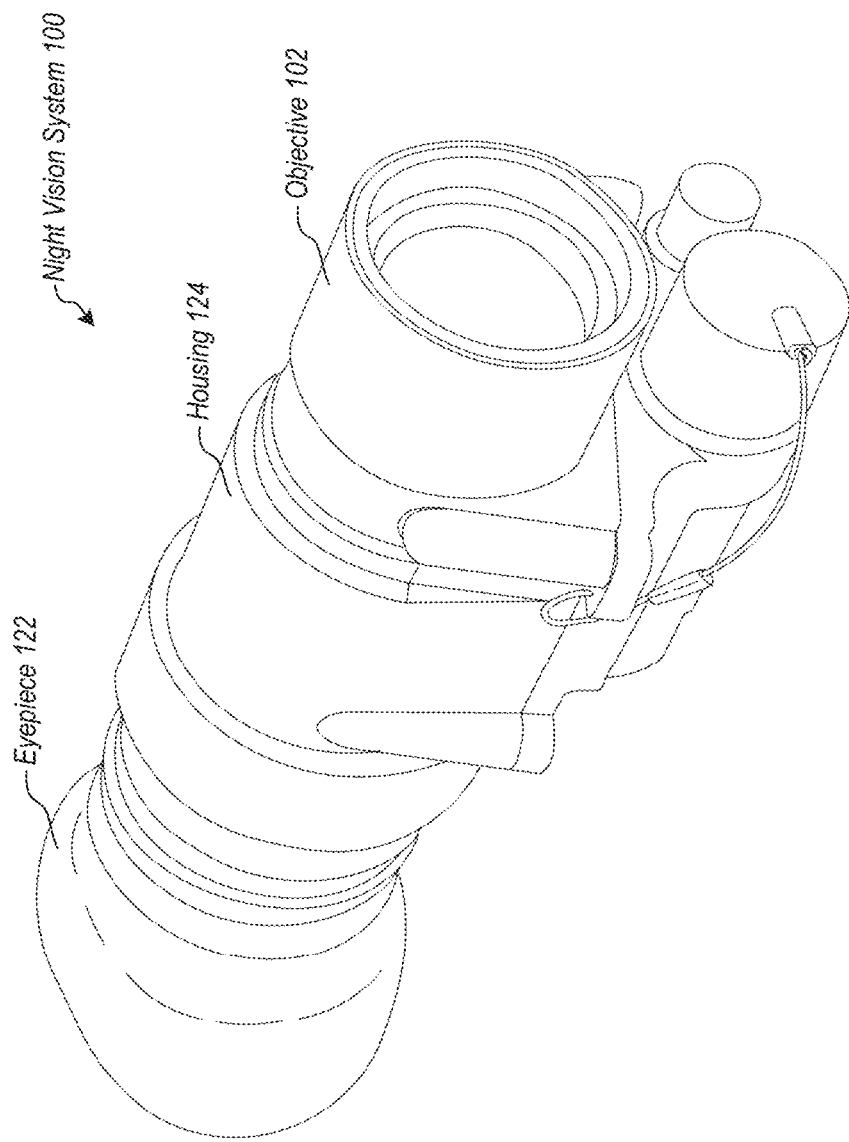
FIG. 1 illustrates a nightvision system.

Additional details are illustrated. Attention is now directed to FIG. 1, where a specific example of a nightvision system is illustrated. In particular, FIG. 1 illustrates the PVS-14 nightvision system 100. In the example illustrated, the nightvision system 100 includes a housing 124. As will be illustrated in more detail below in other figures, the housing 124 houses a transparent device having multiple detectors for detecting intensified light from the image intensifier, and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for focusing images created by the nightvision system 100, including images created by an image intensifier and images created by a transparent device, into the eye of the user.

Figure 2:
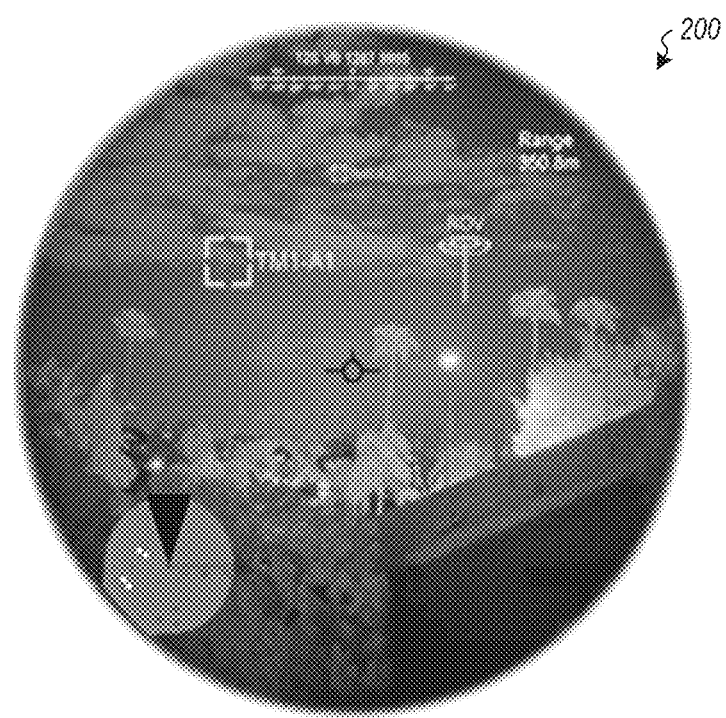
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an image intensifier. Some embodiments described herein are directed to implementing a heads-up display implemented by adding image overlay capabilities with a nightvision system, where the image overlay capabilities are able to overlay additional images over the ordinarily monochrome night vision image. In particular, embodiments further include as part of the transparent device, a transparent display configured to output images over the image intensifier image based on additional information about objects in the image intensifier image.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc. In some embodiments, the heads-up display can superimpose color image data over intensified light images to colorize the images. Note also that due to psychovisual perception in humans, there is no need to fully colorize an intensified light image. Rather, some embodiments, can use color oversaturated grid lines, horizontal lines, diagonal lines, dots, or event text to create a perception of colorization for monochrome image intensifier images. An example of this technology is referred to as the color assimilation grid. In some embodiments, by using colored text, additional textual information can be provided when the user focuses their attention on the text, but when the user focuses on the image as a whole, the colored text will serve to simply colorize the image due to the psychovisual perception phenomenon discussed above.

Note that the transparent device (or other elements) may include photodetectors for detecting intensified light. Detecting intensified light can be used to determine the locations of various objects in the field of view. This information can be used for target indicators or other images output by the transparent device.

Figure 3:
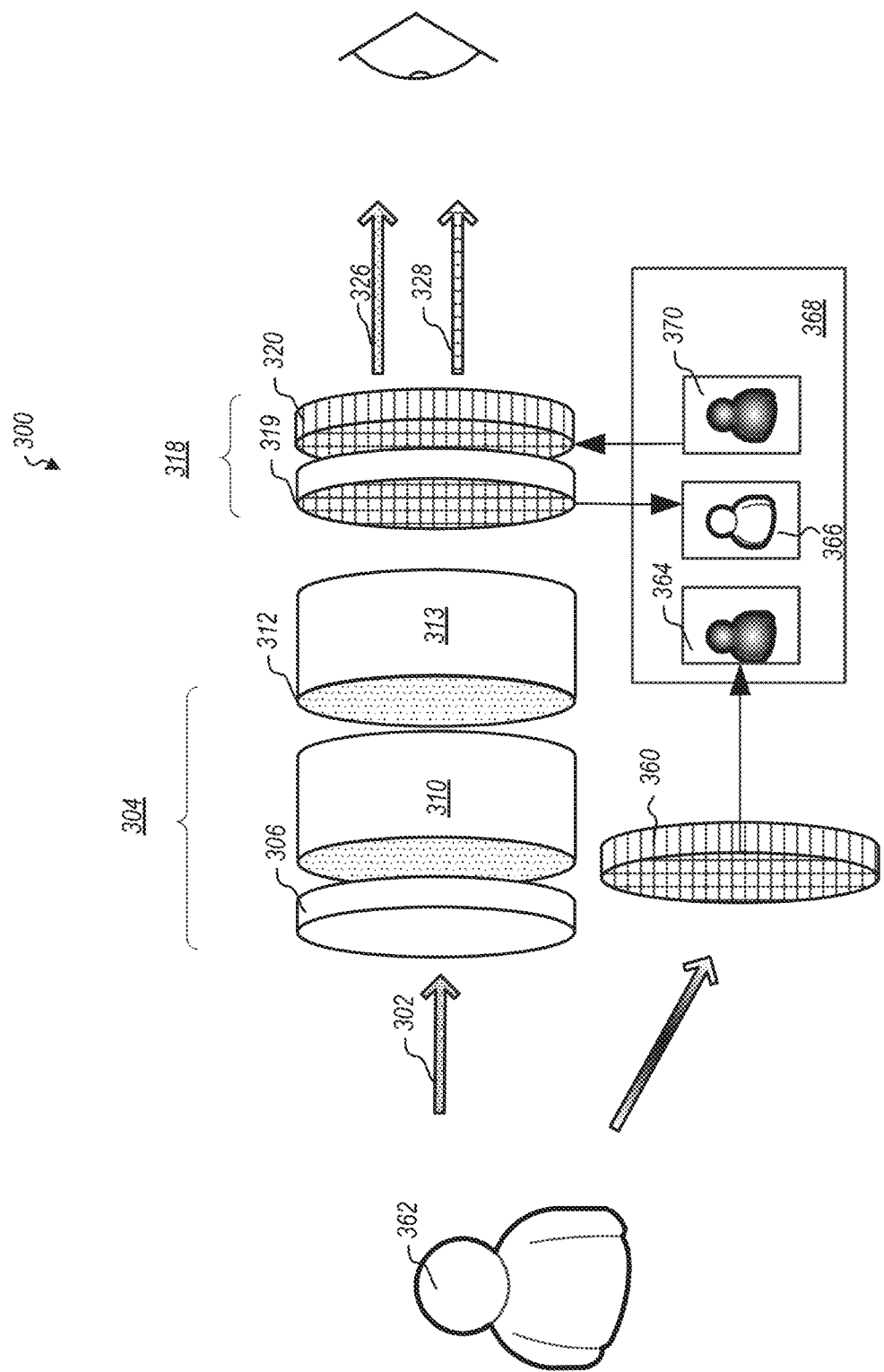
FIG. 3 illustrates a block diagram of components of a nightvision system.

Attention is now directed to FIG. 3. FIG. 3 illustrates a block diagram version of a nightvision system 300. While not shown in FIG. 3, a nightvision system typically includes an objective (such as that shown in FIG. 1 at 102) to focus input light 302 into an underlying device 304, which in this case is an image intensifier. Such input light may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not detectable in the visual spectrum for human observers. A third source of light may be light emitted by an object itself. For example, this may be related to infrared heat energy emitted by the object and directed into the objective. Nonetheless, the nightvision system is able to convert the light emitted from the source into a viewable image for the user.

The objective directs input light 302 into an underlying device 304. Note that the underlying device 304 may include functionality for amplifying light received from the fiber optic faceplate to create a sufficiently strong image that can be viewed by the user. This may be accomplished using various technologies such as a photocathode 306, a microchannel plate 310, and a phosphor screen 312. The photocathode 306 may be configured to generate photo electrons in response to incoming photons. Electrons from the photocathode 306 are emitted into the microchannel plate 310. Electrons are multiplied in the microchannel plate 310. Electrons are emitted from the microchannel plate 310 to a phosphor screen 312 which glows as a result of electrons striking the phosphor screen 312. This creates an image from the filtered light based on the input light 302.

A fiber-optic 313 carries this image as intensified light to the eyepiece (such as eyepiece 122 illustrated in FIG. 1) of a nightvision system where it can be output to the user. This fiber-optic can be twisted 180 degrees to undo the inversion caused by the system objective to allow for convenient direct viewing of the screen. However, as illustrated below, the intensified light is output to the user through a transparent device 318. The transparent device 318 allows intensified light to pass through the transparent device 318, but also generates its own light, from a transparent display 320 which includes LEDs or other light emitters, to transmit light to a user. Creating a transparent device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

As discussed above, the transparent device 318 may include functionality for displaying information to a user. Such information may include graphical content, including text, images, and the like.

In the example illustrated in FIG. 3, the transparent device 318 outputs display light 326 which can be sent to the eyepiece (such as the eyepiece 122 illustrated in FIG. 1). As noted previously, the intensified light 328 transmitted through the transparent device 318 is also provided to the eyepiece. Thus, an image such as that illustrated in FIG. 2 is presented to the user in the nightvision system.

Figure 5:
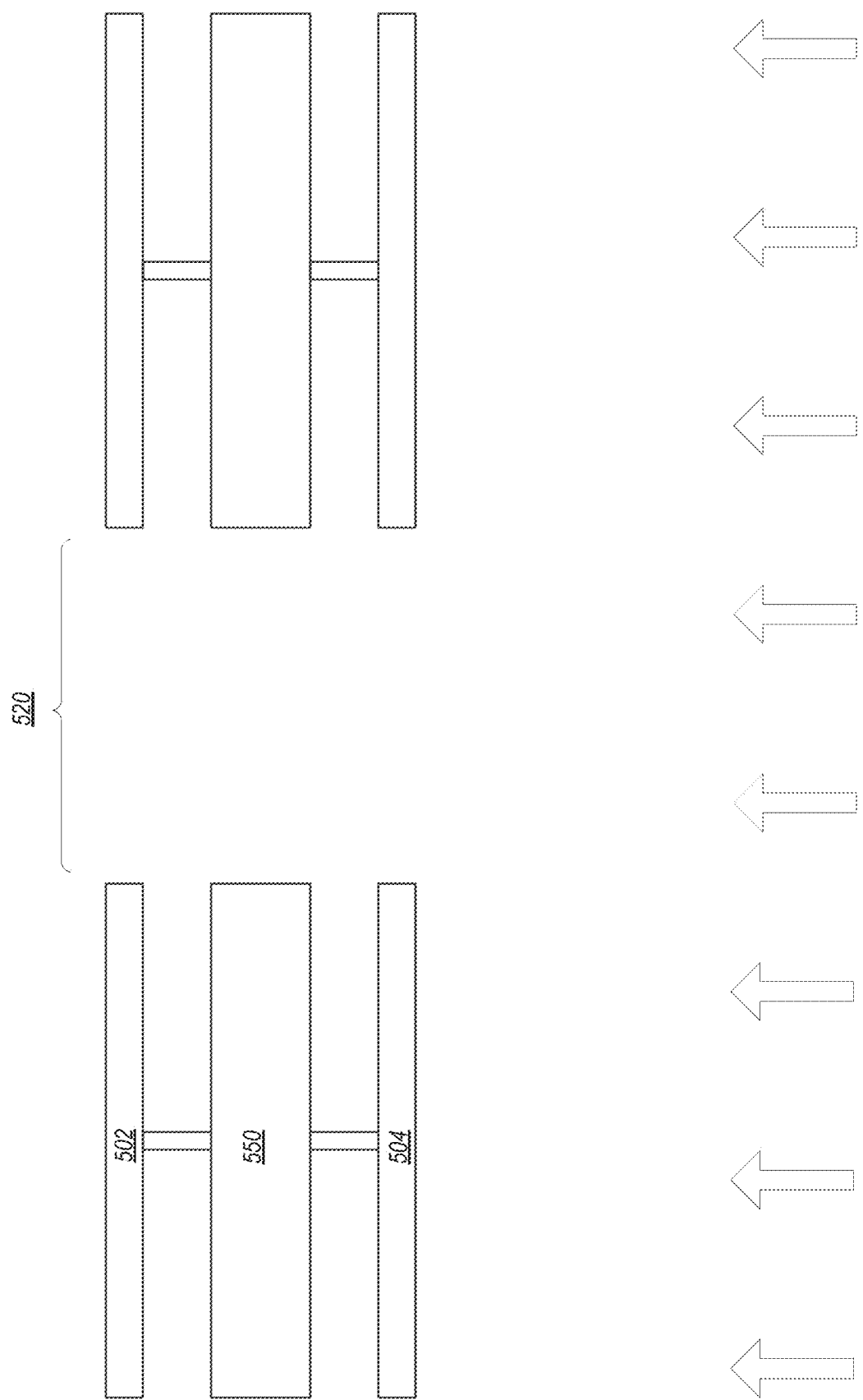
FIG. 5 illustrates a transparent display and detector structure.
Figure 6:
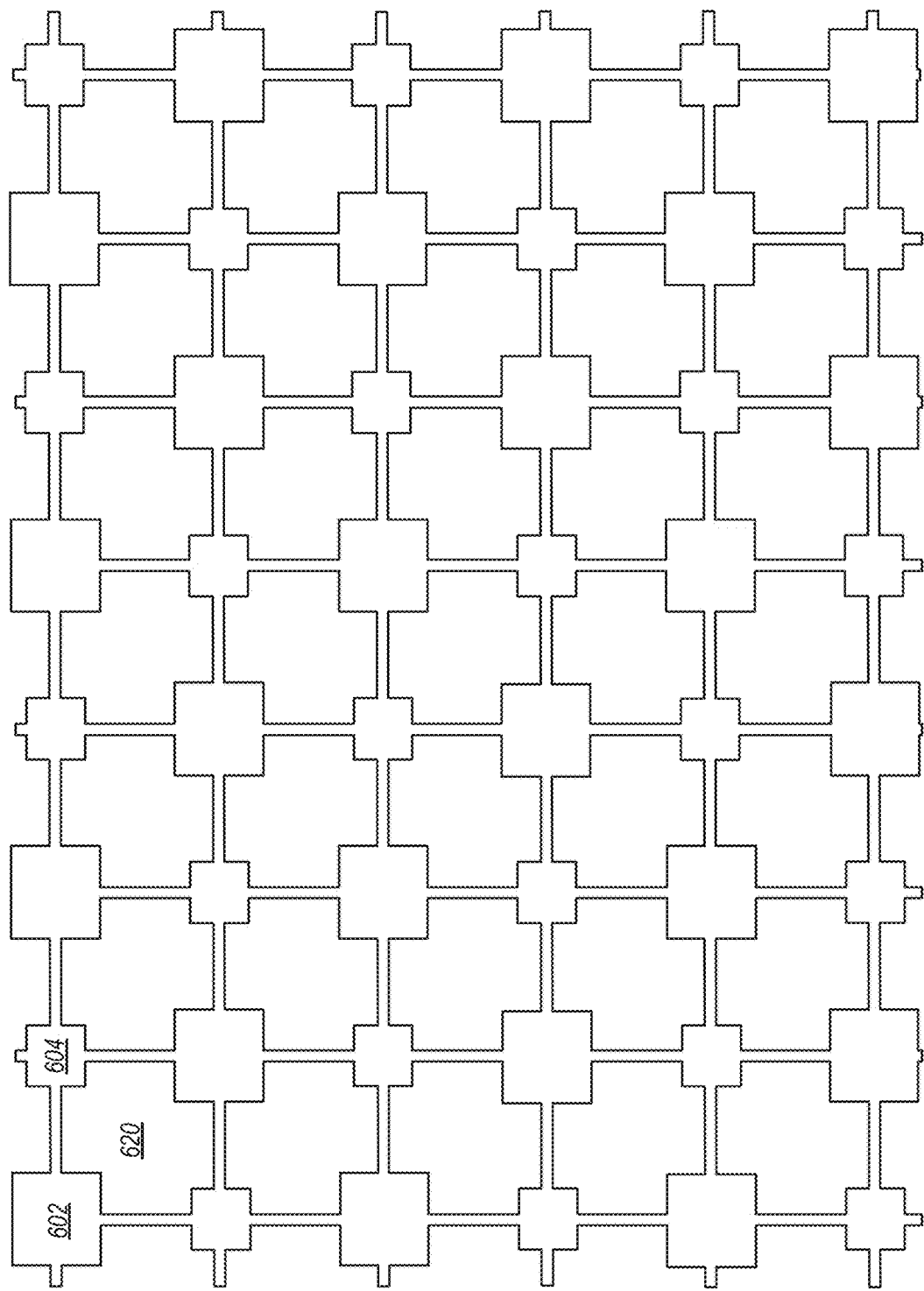
FIG. 6 illustrates a top view of a semiconductor layout including light emitters and detectors with transparent regions therebetween.

The transparent device also includes a transparent photodetector 319, which includes a plurality of detectors for detecting light from the underlying device 304. While shown separately in FIG. 3, the transparent display 320 and transparent photodetector 319 are often implemented on the same semiconductor chip. For example, detector elements could be interdigitated with display elements. An example of this is illustrated in FIG. 6, where display elements (represented by example display element 602) are interdigitated laterally with detector elements (represented by the example detector element 604), with transparent regions (represented by the transparent regions 620). An alternative example is illustrated in FIG. 5, where detector elements, such as detector element 504 is implemented below an active silicon island 550, which is implemented below a display element 502. Note that 'below' used here is relative to the arrangement shown in FIG. 5. In practice, the detectors 504 are in an optical path of incoming light such that the detectors block (at least partially) light from being transmitted to the active silicon island 550 and display element 502.

As noted previously, the transparent device 318 is composed of a number of active silicon areas. In particular, the transparent device 318 is a digital display having a certain pixel density. Each pixel has one or more transistors controlling one or more OLED emitters. In some embodiments illustrated herein, as shown above, the pixels may further include light detectors. This can be useful for detecting the intensified light from the phosphor screen 312. This detected light can be used to characterize the image intensifier image, which can in turn be used to determine how light 326 is output from the transparent device 318.

In some embodiments, the detected light can additionally be used for recording scene events and/or improving placement of elements displayed on the heads-up display. In any case, the transparent device 318 is representative of a stacked device formed in a semiconductor chip that overlaps an underlying device, in this case, the underlying device is an image intensifier. The stacked device is transparent to light in a first spectrum, which in this case is the visible spectrum of light output by the phosphor screen 312. That is, the transparent device 318 is not fully transparent due to the blocking of the active devices, but transparency referred to herein refers to at least partial transparency according to some transmission efficiency Indeed, the more active devices implemented per pixel, the less transparent the transparent device 318 becomes. Thus, some embodiments are specifically implemented in a fashion designed to limit the number of active devices per pixel, such as by including only a single detector per pixel. However, other embodiments may be implemented with multiple detectors per pixel.

Each detector absorbs a portion of the intensified light converting it to an electrical signal. For example, embodiments can implement a two-dimensional array of detectors that generate charges, current, or any other form of digital data level proportional to intensity of the intensified light as a function of position. An example of this is illustrated in FIG. 6 by the detectors shown there, of which detector 604 is representative. Accordingly, the detectors may generate a two-dimensional array of electrical charge that represents at least portions of the intensified image. This two-dimensional array of electrical charges can be periodically read from the detectors (e.g., the detected signal can be read from the detectors like in a charged coupled device (CCD) camera).

The two-dimensional array of electrical charges from the photodetector 319 is processed and/or used locally, e.g., within the transparent device 318 to modulate in real time the amplitude of the display light 326 output by the transparent device 318. In particular, the transparent device 318 will output light based on the light detected by the detectors along with other information.

As noted previously, the transparent device 318 includes regions that are transparent to intensified light output by the underlying device 304. For example, FIG. 6 illustrates a number of transparent regions, of which transparent region 620 is representative.

Figure 4:
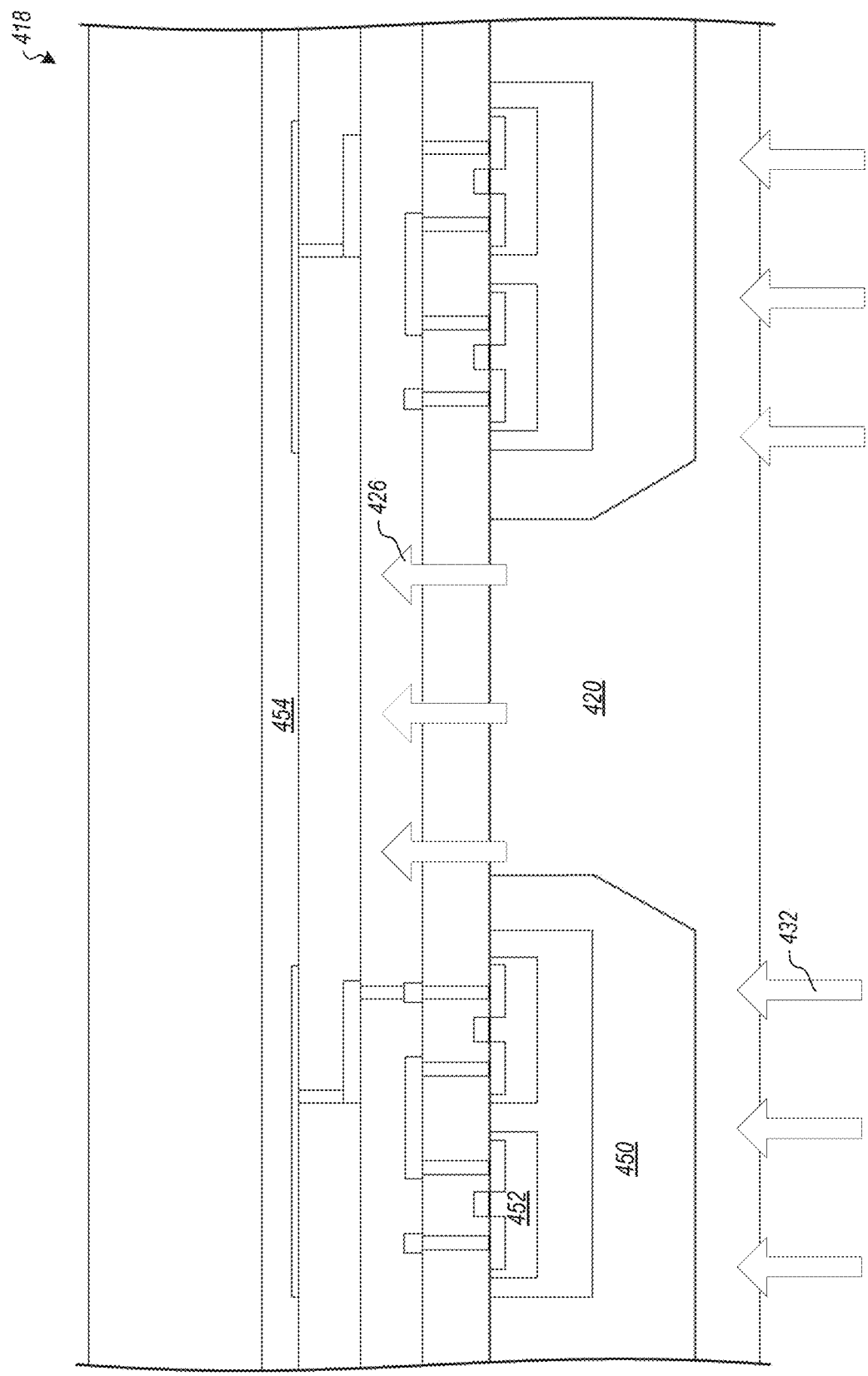
FIG. 4 illustrates a transparent display structure cross-section view, including transparent regions.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials. For example, reference is now made to FIG. 4 which illustrates a transparent device 418 including active silicon areas shown as active silicon islands (which may be native silicon islands) such as active silicon island 450. In particular, active silicon islands include transistors such as transistor 452 which control OLED emitters in an OLED stack 454. Note, that as discussed above, transistors also control detectors, such as various photodiodes or other detectors. In the example illustrated in FIG. 4, each of the active silicon islands represents a pixel or sub-pixel of the transparent device 418. Thus, by illuminating various LEDs in the OLED stack 454 using the transistors in the active silicon islands, an image can be created and output to a user, such as by outputting display light such as the display lights 326 illustrated in FIG. 3.

As illustrated in FIG. 3, intensified light is transmitted through the transparent device 318 to the eyepiece of the nightvision system, and then to the user. Note, however, that the intensified light is transmitted to the user through the transparent device 318, meaning that the intensified light will be affected by characteristics of the transparent device 318.

Referring once again to FIG. 4, light 426 represents light that is transmitted through transparent portions, illustrated by the transparent region 420, of the transparent device 418, while light 432 is blocked by active portions of the transparent device 418.

However, transmission of light through the transparent device is nonetheless increased by removing portions of silicon that are not needed for implementing active electrical components or for supporting metal traces. For example, consider an example where dynamic pixel cells are used. In this particular example, there are two sub pixels per pixel. Anode size for the sub pixels is 8 μm×5.1 μm. Pixel area is 10.1 μm×12.4 μm. Pixel pitch is 22.5 μm×22.5 μm. In one example, provides a resolution of 800×800. In this particular transparent device, if the non-active silicon islands are not removed, transparency of the transparent device is about 33%. In contrast, transparency is about 61% if the non-active silicon islands are removed such as in the structure illustrated in FIG. 4. Thus, in this example, transparency of a transparent device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that transparent device will have a lower transparency than an equivalently sized transparent device with a lower resolution. Thus, for example, a transparent device with a 36 μm pitch can obtain a transparency of 81%, while a transparent device of 22.5 μm pitch can obtain a transparency of 67%, while a transparent device having a 17.5 μm pitch will be about 55% transparency when non-active silicon islands are removed from the transparent device in each of the illustrated examples. Thus, some embodiments may be able to create a transparent device with at least a 36 μm pitch with at least a transparency of 75%, or a transparent device of at least a 22.5 μm pitch with at least a transparency of 60%, or a transparent device having at least a 17.5 μm pitch with at least a 50% transparency when silicon is removed between active silicon areas. The preceding illustrates one specific example related to a particular manufacturing process.

Pitch and transparency values may be specific to a given semiconductor manufacturing process—also known as the technology or process node—and will of course vary as the node changes. Typically designating the process's minimum feature size, the technology node will dictate the area of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

Returning once again to FIG. 3, a particular example is further illustrated. In this example, the nightvision device further includes a second sensor 360. For example, the second sensor 360 in this example may be a thermal camera sensor. In the illustrated example, the second sensor 360 detects thermal energy from an object 362 in an environment. Note that the underlying device 304 also detects the object 362. However, the underlying device 304 and the second sensor 360 are laterally offset from each other. This would cause parallax issues if the output from the underlying device 304 and the second sensor 360 were output directly to the user. Indeed, any difference in sensor position causes parallax issues. In particular, FIG. 3 illustrates a scene 364 output by the second sensor 360. The transparent photodetector 319 detects the scene 366 as output by the underlying device 304. Information characterizing the detected scene 366 is provided to control electronics 368. Note also that the scene 364 detected by the second sensor 360 is also provided to the control electronics 368. The control electronics 368 can adjust the scene 364 to an adjusted scene 370, which can then be output to the transparent display 320. The adjusted scene 370 can be adjusted to align with the scene 366 detected by the underlying device 304. Thus, the scene output by the underlying device 304 and the scene output by the second sensor 360 can be aligned to correct any parallax issues. That is, the light 328 and 326 will be correlated based on processing at the control electronics 368, based on external information known about objects in the scene. In particular, the second sensor 360 provides additional information (e.g., thermal information) about the object 362. This information is used to determine how the display elements in the transparent display 320 are modulated.

Thus, embodiments implement a plurality of detectors in the photodetector 319. The detectors are configured to detect light in a first spectrum (e.g., a visible spectrum consistent with output from the phosphor screen 312) from the underlying device 304 that can be used to detect the objects (such as object 362) in a scene image output by the underlying device 304.

Light emitters in the transparent display 320 are configured to output light dependent on light detected by the detectors in the photodetector 320 and additional information about characteristics of the objects in the environment. In the example illustrated, the additional information is the additional information from the second sensor 360 provided to the control electronics 368. Thus, for example, the additional information, in this illustration, is provided by a device (i.e., the second sensor 360) proximate the underlying device.

In some embodiments, the light emitters are configured to outline or otherwise highlight one or more of the objects in the environment. For example, the light emitters in the transparent display 320 may be configured to outline the object 362 displayed to the user from the underlying device 304. This may be done to highlight the object due to some previously determined criteria. For example, the additional information may include information about characteristics of objects. In one example, the information may be a determination that the object represents a human. If embodiments have criteria implemented that humans be highlighted to the user, then the object 362 can be outlined (or have other indicators displayed) indicating that the object 362 is a human. Various characteristics about objects can be determined based on sensors, expert systems, machine learning algorithms, or other techniques for classifying objects or characteristics about objects.

Embodiments may be implemented where the detectors in the transparent photodetector 319 are configured to be used for edge detection to detect edges of the objects in the context of the image.

In some embodiments, such as the example illustrated above, the additional information comprises thermal information, such as thermal information from a thermal camera sensor. In some such embodiments, the light emitters in the transparent display 320 are configured to output representations of the thermal information overlaid on one or more objects in the image where the thermal information is constrained to be within boundaries of the one or more objects.

In some embodiments, the additional information is provided in a pulsed sample format such that the light emitters output light for a series of images using the same additional information. For example, consider the example above where thermal information is obtained. In one example, a single frame of thermal information may be used to colorize video for a predetermined period of time based on the assumption that the thermal information changes slowly over time. Alternatively, the pulsed information may be pulsed IR information, lidar, sonar, radar, or other information. In some embodiments, the pulsed information could be used to detect information about objects, such as distance, height, width, etc. This information could be displayed textually using the transparent display 320. Indeed, some embodiments may be able to detect height, width, and estimate weight of a human subject. Such information could be displayed by the transparent display 320. Alternatively, additional processing could be done by the control electronics 368 to determine other information. For example, a user may indicate to the system 300, using a user interface for the control electronics 368, that the user is looking for a particular individual. If characteristics about the particular individual are known, a determination can be made using pulsed information and/or other information when it is likely that the particular individual has come in to view. An indication can then be displayed that the particular individual has come in to view which can also identify the individual using an outline, caret pointer, colorization of the individual, etc. Embodiments may also display a computer likelihood that the highlighted individual is the desired individual.

Further, the embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device comprising:
    an underlying device configured output light, to an optical output to output an image of objects in an environment to a user, in a first spectrum as a result of absorbing input light;
    a stacked device configured to be coupled in an overlapping fashion to an optical output of the underlying device, the stacked device being transparent, according to a first transmission efficiency, to light in the first spectrum, the stacked device comprising:
        a plurality of electro-optical circuits including:
            a plurality of light emitters configured to output light;
            a plurality of detectors configured to detect light in the first spectrum from the underlying device that can be used to detect the objects in the image; and
            wherein the light emitters are configured to output light dependent on light detected by the detectors and additional information about characteristics of the objects in the environment, wherein the additional information comprises thermal information, and wherein the light emitters are configured to output representations of the thermal information overlaid on one or more objects in the image where the thermal information is constrained to be within boundaries of the one or more objects.

2. The optical device of claim 1, wherein the additional information is provided by a device proximate the underlying device.

3. The optical device of claim 1, wherein the light emitters are configured to outline one or more of the objects in the image.

4. The optical device of claim 1, wherein the detectors are configured to be used for edge detection to detect edges of the objects in a context of the image.

5. An optical device comprising:
    an underlying device configured output light, to an optical output to output an image of objects in an environment to a user, in a first spectrum as a result of absorbing input light;
    a stacked device configured to be coupled in an overlapping fashion to an optical output of the underlying device, the stacked device being transparent, according to a first transmission efficiency, to light in the first spectrum, the stacked device comprising:
        a plurality of electro-optical circuits including:
            a plurality of light emitters configured to output light;
            a plurality of detectors configured to detect light in the first spectrum from the underlying device that can be used to detect the objects in the image; and
            wherein the light emitters are configured to output light dependent on light detected by the detectors and additional information about characteristics of the objects in the environment, wherein at least a portion of the additional information is provided in a pulsed sample format such that the light emitters output light for a series of images using the same additional information.

6. The optical device of claim 5, wherein at least a portion of the additional information is provided by at least one of lidar, sonar, or radar.

7. A method of manufacturing an optical device, the method comprising:
    connecting a stacked device to an underlying device, the underlying device configured to output light, to an optical output to output an image of objects in an environment to a user, in a first spectrum as a result of absorbing input light, wherein the stacked device configured to be coupled in an overlapping fashion to an optical output of the underlying device, the stacked device being transparent, according to a first transmission efficiency, to light in the first spectrum, the stacked device comprising:
        a plurality of electro-optical circuits including:
            a plurality of light emitters configured to output light;
            a plurality of detectors configured to detect light in the first spectrum from the underlying device that can be used to detect the objects in the image;
    connecting control electronics to the light emitter in a fashion configured to cause the light emitters to output light dependent on light detected by the detectors and additional information about characteristics of the objects in the environment; and
    coupling a pulsed sensor to the control electronics, such that the additional information comprises a pulsed sample format such that the light emitters output light for a series of images using the same additional information.

8. The method of claim 7, wherein the additional information is provided by a device proximate the underlying device.

9. The method of claim 7, wherein the light emitters are configured to outline one or more of the objects in the image.

10. The method of claim 7, wherein the detectors are coupled to the control electronics to allow the control electronics to perform edge detection to detect edges of the objects in a context of the image.

11. A method of manufacturing an optical device, the method comprising:
    connecting a stacked device to an underlying device, the underlying device configured to output light, to an optical output to output an image of objects in an environment to a user, in a first spectrum as a result of absorbing input light, wherein the stacked device configured to be coupled in an overlapping fashion to an optical output of the underlying device, the stacked device being transparent, according to a first transmission efficiency, to light in the first spectrum, the stacked device comprising:
    a plurality of electro-optical circuits including:
    a plurality of light emitters configured to output light;

a plurality of detectors configured to detect light in the first spectrum from the underlying device that can be used to detect the objects in the image;
connecting control electronics to the light emitter in a fashion configured to cause the light emitters to output light dependent on light detected by the detectors and additional information about characteristics of the objects in the environment; and
coupling a thermal camera sensor to the control electronics, such that the additional information comprises thermal information, and wherein the control electronics are configured to cause the light emitters are to output representations of the thermal information overlaid on one or more objects in the image where the thermal information is constrained to be within boundaries of the one or more objects.

12. The method of claim 7, wherein the pulsed sensor comprises at least one of lidar, sonar, or radar to the control electronics to provide the additional information.

13. A method of displaying information in an optical device the method comprising:
at an underlying device, absorbing input light;
at the underlying device, outputting light, to an optical output to output an image of objects in an environment to a user, in a first spectrum as a result of absorbing the input light;
at a stacked device, coupled in an overlapping fashion to an optical output of the underlying device, transmitting at least a portion of the light in the first spectrum through the stacked device to output the image to the user;
at the stacked device, outputting light using a plurality of light emitters;
at the stacked device, detecting light in the first spectrum from the underlying device to detect the objects in the image;
receiving additional information about characteristics of the objects in the environment, wherein the additional information is provided in a pulsed sample format such that the light emitters output light for a series of images using the same additional information; and
wherein outputting light using the plurality of light emitters is dependent on light detected by the detectors and the additional information about characteristics of the objects in the environment.

14. The method of claim 13, wherein the additional information is provided by a device proximate the underlying device.

15. The method of claim 13 further comprising, the light emitters outlining one or more of the objects in the image.

16. The method of claim 13 further comprising, performing edge detection using output from the detectors to detect edges of the objects in a context of the image.

17. A method of displaying information in optical device the method comprising:
at an underlying device, absorbing input light;
at the underlying device, outputting light, to an optical output to output an image of objects in an environment to a user, in a first spectrum as a result of absorbing the input light;
at a stacked device, coupled in an overlapping fashion to an optical output of the underlying device, transmitting at least a portion of the light in the first spectrum through the stacked device to output the image to the user;
at the stacked device, outputting light using a plurality of light emitters;
at the stacked device, detecting light in the first spectrum from the underlying device to detect the objects in the image;
receiving additional information about characteristics of the objects in the environment, wherein the additional information comprises thermal information, the method further comprising the light emitters outputting representations of the thermal information overlaid on one or more objects in the image where the thermal information is constrained to be within boundaries of the one or more objects; and
wherein outputting light using the plurality of light emitters is dependent on light detected by the detectors and the additional information about characteristics of the objects in the environment.

18. The method of claim 13, wherein the additional information comprises at least one of lidar, sonar, or radar information.

19. The method of claim 13, wherein the additional information can be used to detect height, width, or estimate weight of a human subject.

20. The method of claim 13, wherein the additional information can be used to identify a particular individual.

* * * * *